Jan. 12, 1971    T. J. MATCOVICH    3,555,364
MICROELECTRONIC MODULES AND ASSEMBLIES
Filed Jan. 31, 1968    4 Sheets-Sheet 1
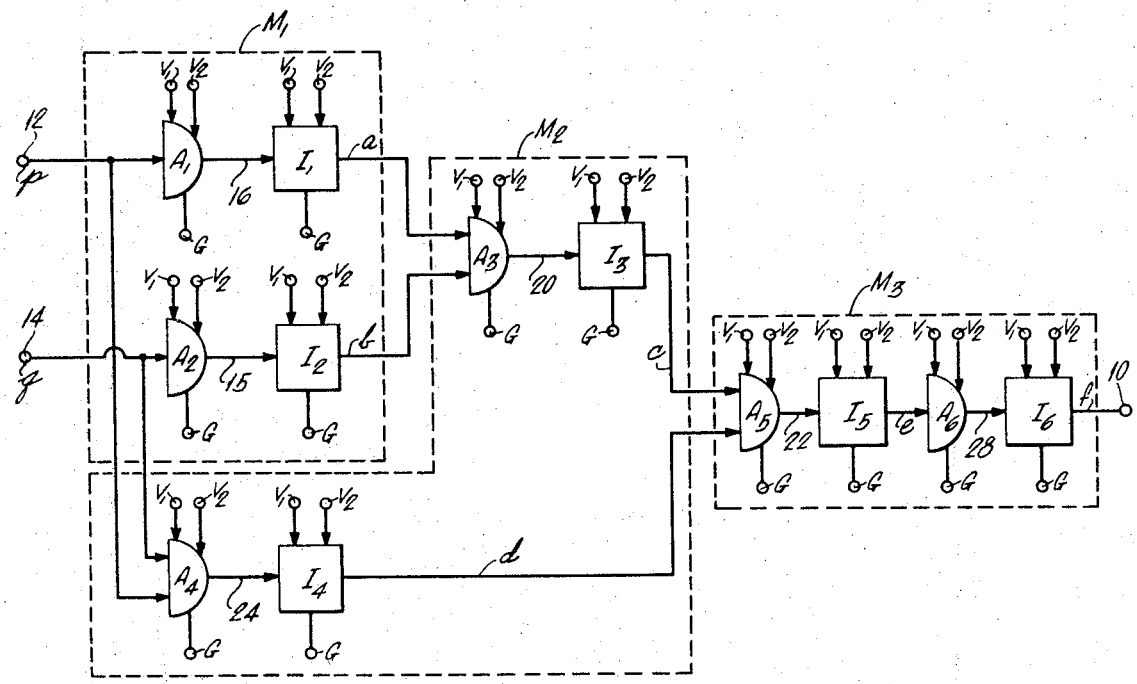
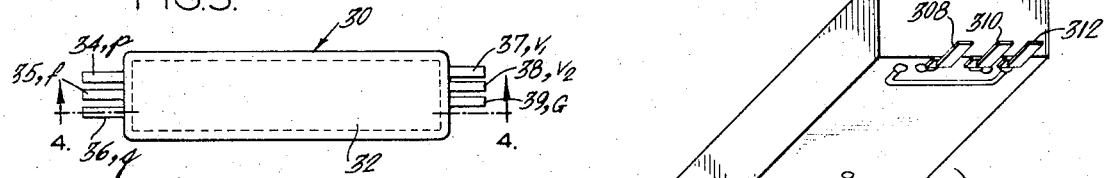
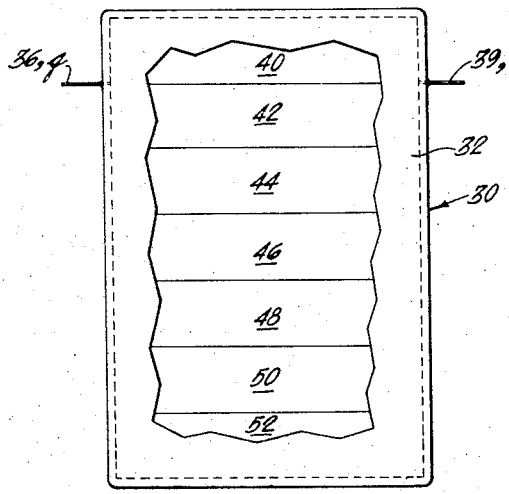
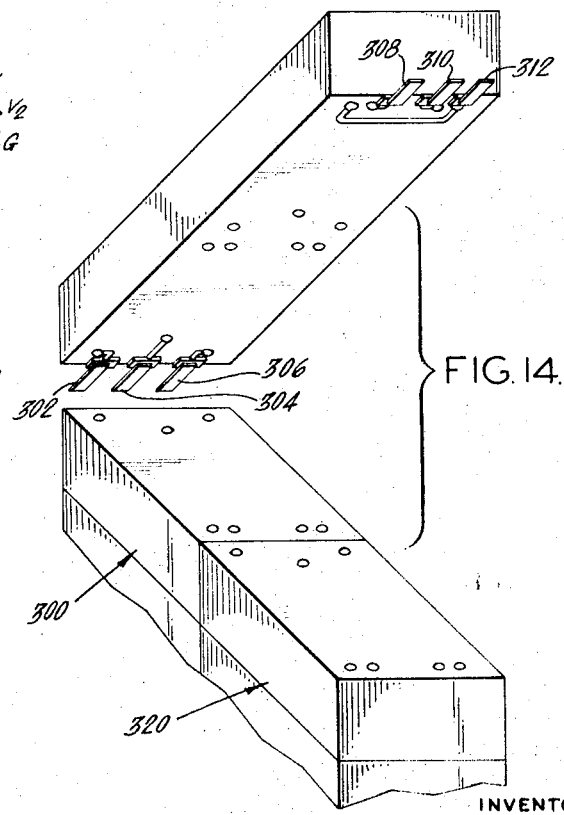
INVENTOR:
THOMAS J. MATCOVICH
BY Howson & Howson
ATTYS.

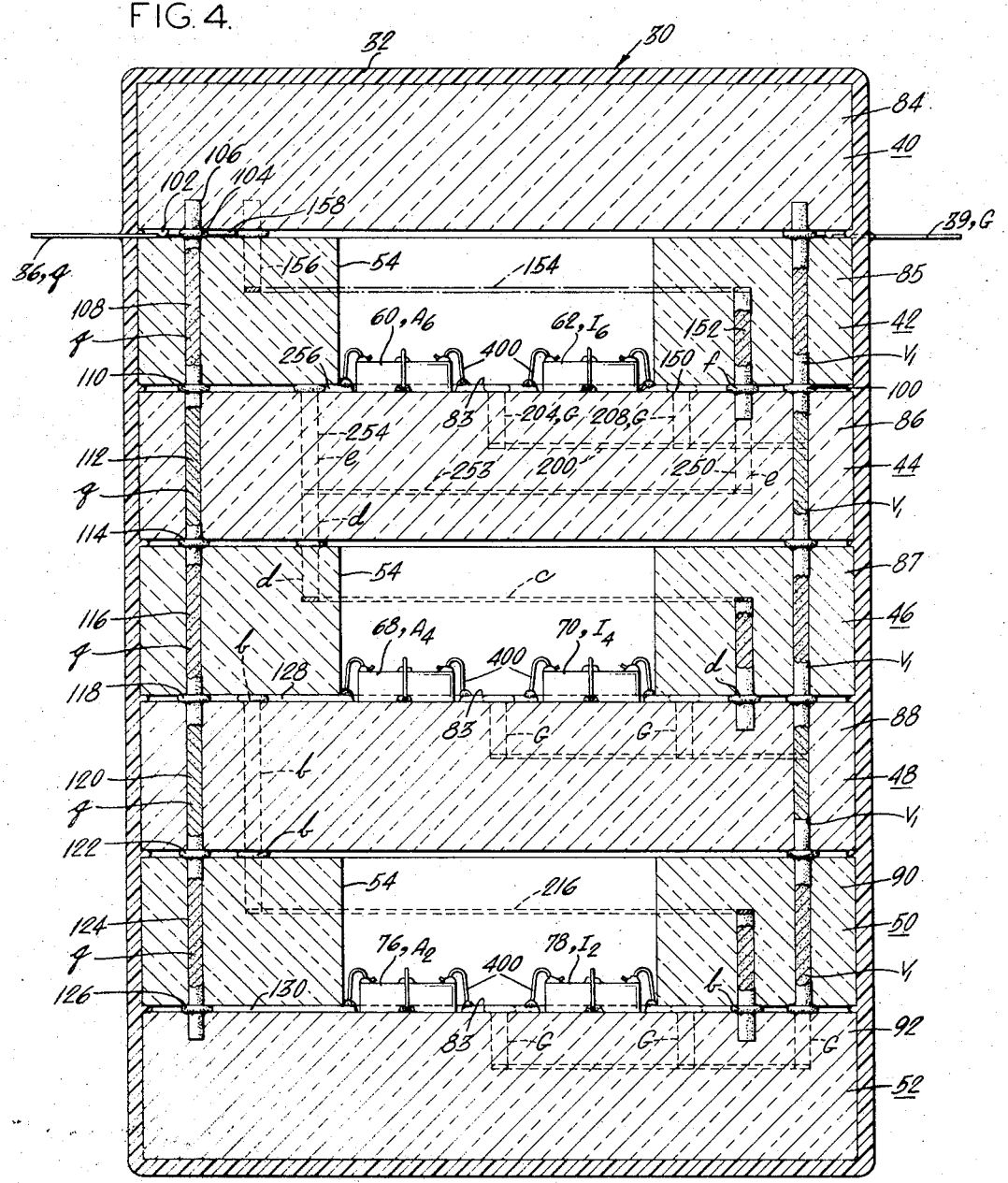

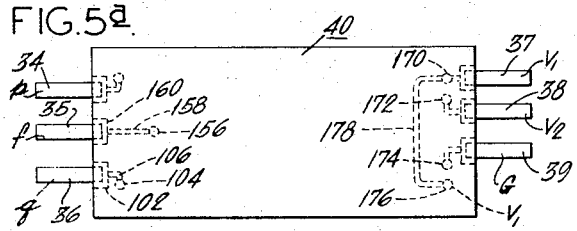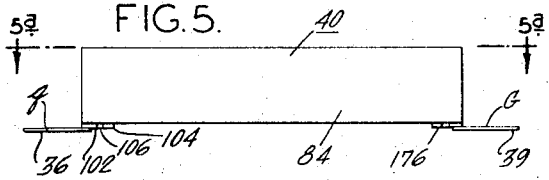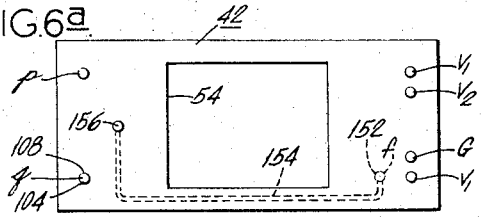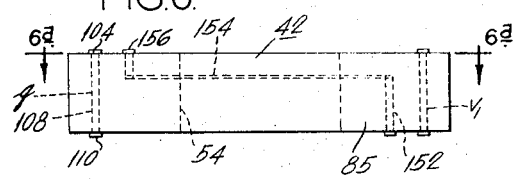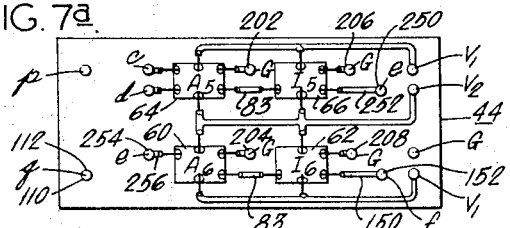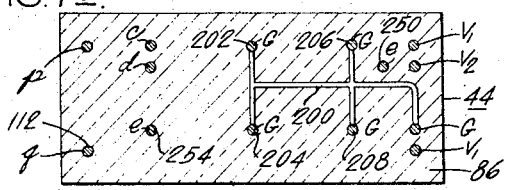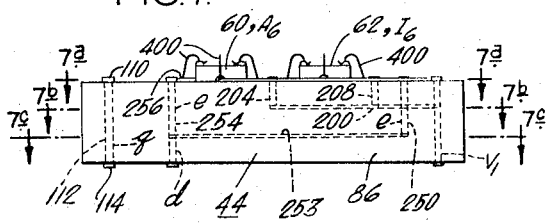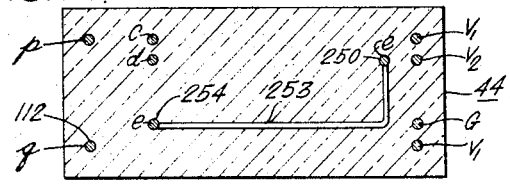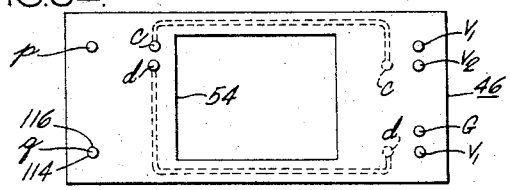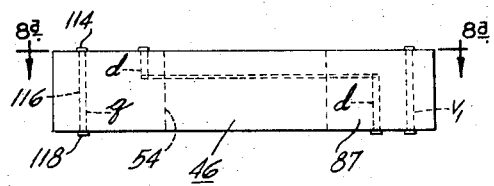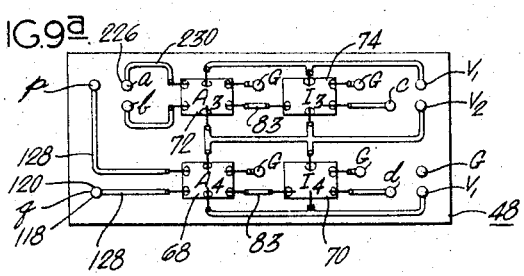

Jan. 12, 1971  T. J. MATCOVICH  3,555,364
MICROELECTRONIC MODULES AND ASSEMBLIES
Filed Jan. 31, 1968  4 Sheets-Sheet 4
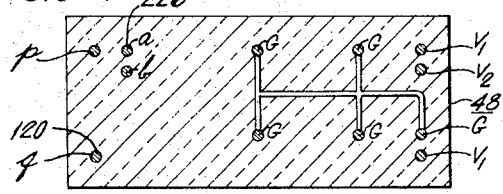
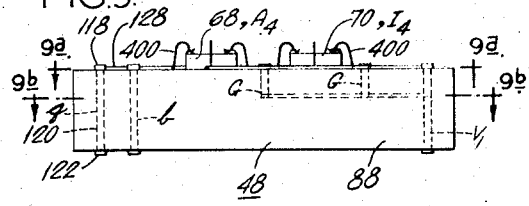
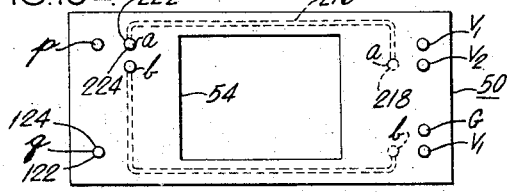
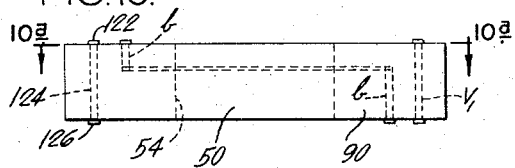
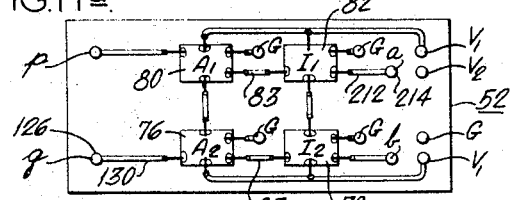
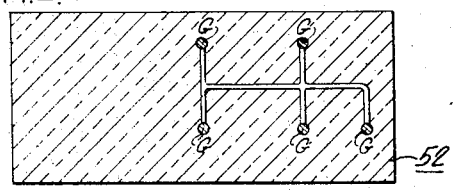
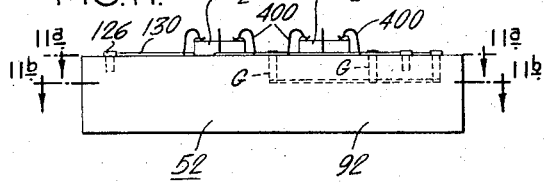
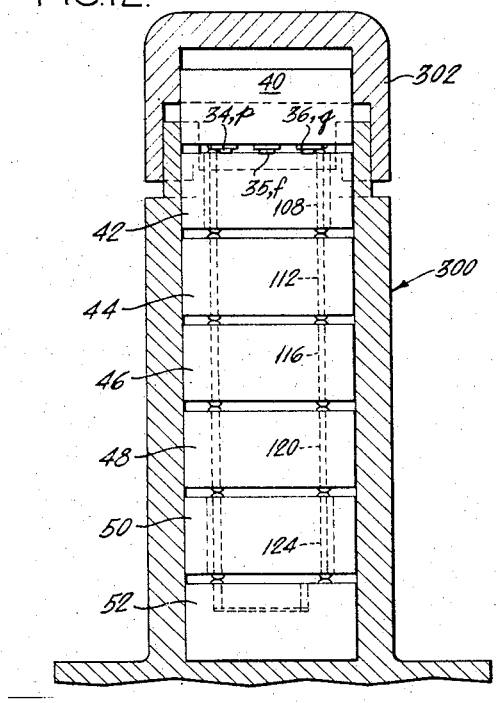
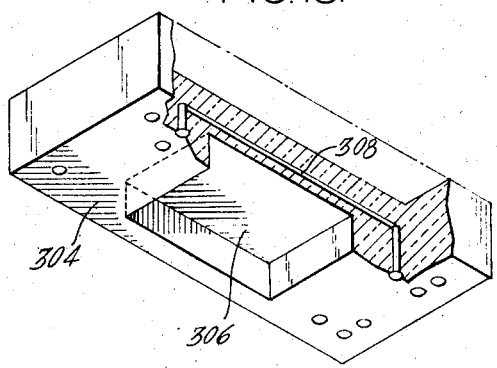
INVENTOR:
THOMAS J. MATCOVICH
BY
Howson & Howson
ATTYS.

United States Patent Office 3,555,364
Patented Jan. 12, 1971

3,555,364
MICROELECTRONIC MODULES AND ASSEMBLIES
Thomas J. Matcovich, Maple Glen, Pa., assignor, by mesne assignments, to Drexel Institute of Technology, a nonprofit corporation of Pennsylvania
Filed Jan. 31, 1968, Ser. No. 702,103
Int. Cl. H05k 1/04
U.S. Cl. 317—101                          4 Claims

ABSTRACT OF THE DISCLOSURE

A vertical stack of multilayer-ceramic micro-electronic circuit-component modules having discrete circuit components mounted thereon and having contacts on opposite surfaces thereof, alternating with multilayer-ceramic transition modules having contacts on their opposite surfaces which mate with, and are bonded to, the corresponding contacts on the adjacent circuit-component modules; the transition modules provide the particular interconnections between the contacts of the circuit-component modules on either side thereof which are required for the particular circuit application. The transition modules are appropriately recessed or apertured to accommodate the discrete components on the circuit-component modules, and preferably an external-connection module is used at one end of the stack to provide transition to standard types of external connectors. (To fabricate the stack, the modules are made separately and provided at the inter-module contact points with globules of solder by a simple dip-soldering method, assembled in a suitable jig for holding the appropriate solder globules of the several modules against each other, and heated to provide simultaneous bonding of all solder connections to each other, thereby to provide electrical connection and physical support in one operation.) The external-connection module may be extended beyond the stack so as to provide similar connection and bonding to another adjacent similar stack.

BACKGROUND OF THE INVENTION

This invention relates to microelectronic apparatus, and particularly to microelectronic modules, modular assemblies and methods for the fabrication thereof.

Microelectronic apparatus is known in the prior art in which circuit components are formed directly on an underlying substrate or mounted thereon as discrete components, and interconnected by "printed" circuitry. In some cases the circuit components such as resistors or capacitors are formed or "printed" directly on the substrate by screening, evaporation or sputtering techniques, for example. When such printed circuits and components are combined with discrete components on the same substrate, the apparatus is commonly designated as a hybrid circuit.

Common tppes of discrete components are fixed or variable inductors, capacitors, resistors, or so-called monolithic circuit components such as assemblies of diodes, transistors, integrated circuit, medium-scale integrated devices or large-scale integrated devices. In some cases the component itself may be a smaller hybrid circuit comprising both printed and discrete elements.

One type of substrate which has been utilized in such apparatus is of ceramic, such as high-purity alumina or berylia. Recently there has been developed a substrate consisting of a multilayer-ceramic board. In this construction, selectively-placed conductors are formed on laminas of "green" (unfired) ceramic having holes through the layers where interconnection between layers is desired, the holes being filled with conductive material; the interconnections are commonly called vias. The layers are stacked togeher and aligned, laminated under pressure, and "fired" or sintered to form a single integral hard ceramic board. Many layers, for example from two to twenty, may be stacked and bonded in this way to produce multiple lapers of circuitry in a single board, which itself is generally quite thin, e.g. $1/16$ to $1/8$ inch in thickness. Such multilayer-ceramic substrates are described in an article entitled "Laminated Ceramics" by B. Schwartz and D. L. Wilcox at pages 19 to 26 of "Proceedings 1967 Electronic Components Conference," 1967, printed by McGregor and Werner, Inc., Washington, D.C.

Interconnections between printed-circuit conductors are inherently provided in the printing process, and connections from the printed circuitry to the discrete components are made by known techniques such as soldering or spot welding of so-called flying leads, or by known lead-frame or pedestal techniques. Connections to exterior apparatus are commonly provided by soldered, welded or plug-in lead frame techniques, or by pins or spring contacts. The entire circuit may be hermetically sealed or encapsulated in an epoxy resin; in the multilayer-ceramic device the interlayer conductors are protected bp the ceramic, and passivation of the exposed active elements may be provided by suitable coating with glass, for example. However, in many products for the consumer market, passivation is not necessary.

Such printed and hybrid circuits utilizing multilayer-ceramic board permit very dense wiring within and on the board, and allow for a large number of cross-overs of the wiring to be accommodated within a single board by means of the conductors located at different levels within the board, in combination with the conducting vias.

Commonly it is desirable to interconnect a number of such microelectronic circuits into a larger circuit required for a particular operation. One way this can be done is to arrange a plurality of the individual integral circuit devices in a common plane, and to solder appropriate wires between the external connectionst hereof as required to produce the overall circuit. This requires that two bonding operations be performed for each of the many interconnections, and in relatively complex equipment the resultant large numbers of bonding operations tend to result in high cost and low reliability of the completed assembly.

In addition, the planar geometries of such assemblies possess two other inherent disadvantages in certain applications. First, the shape of the assembly may not be adapted for the space and location in which it must be used; for example, a generally cubical shape would be used very inefficiently by a planar configuration. Secondly, the planar configuration inherently requires one extreme portion of the circuitry to be widely spaced from the opposite extreme portion, and if the electrical requirements dictate connection between these widely-spaced circuit portions then long connecting conductors are necessary. In certain high-frequency applications such undue length of connecting leads is undesirable, and in some cases completely debilitating. Among the adverse factors introduced by such long leads are lengthened signal time delays, signal distortion, capacitive circuit loading, and in some cases undue sensitivity to pick-up of stray fields.

Accordingly, in many applications a three-dimensional assembly shape has advantages, and may be achieved by mounting the individual printed-circuit units in a stack, one above another, with their broad major surfaces confronting each other. This general form of assembly has been utilized in the prior art in some cases, in which the conventional external leads of each unit extend from the sides thereof and are connected by wires to the appropriate external leads of other units.

Such stacked assemblies of the prior art generally require a large number of lead-bonding operations, special mountings to maintain the stacked arrangements, and spacings between stacked units which waste space along the direction of stacking; furthermore, they generally involve a mass of unsupported and somewhat delicate connecting leads, which are often longer than would be desirable, and tend to be difficult, tedious and costly to assemble.

In addition, in any assembly of microelectronic units it is desirable to provide a modular construction, i.e. one which is made up of individual basic modules having many characteristics in common, the desired overall circuit being provided by appropriate interconnection of the individual basic modules and in some cases by some minor modification or substitution in some of the modules. This permits a certain degree of desirable standardization in the fabrication of the individual modules. In a non-modular construction in which each unit of a stack assembly is individually custom-designed and fabricated, the designer is provided with a maximum of flexibility in design but the costs are high and reliability low, since the production runs for each specific device are relatively small. It is therefore desirable to provide a construction which will allow the manufacture to produce a rather standard unit or module (such as one having a fixed module size and terminal location, and having connections and components suitable for many applications without change or with only minor change) while permitting the designer or customer to retain substantial flexibility in design of the overall assembly by prescribing various interconnections between modules, various numbers of modules per stack, and various minor modifications or substitutions in the modules.

It is of course also desirable that the stack assembly be simple and easy to fabricate.

Accordingly it is an object of the invention to provide a new and useful microelectronic assembly.

Another object is to provide a new and useful module for use in a microelectronic assembly.

A further object is to provide a new and useful process for fabricating microelectronic modules and assemblies.

Another object is to provide a new and useful modular microelectronic assembly which is compact, easily fabricated, requires a minimum of bonding operations, provides a modular construction, minimizes interconnecting lead lengths and provides a three-dimensional geometry.

A further object is to provide the latter type of assembly which is compatible with, and realizes the advantages of, modles using laminated-ceramic substrates.

SUMMARY OF THE INVENTION

These and other objects of the invention are achieved by the provision of a modular three-dimensional microelectronic assembly in which microelectronic circuit-component modules are positioned with their major surfaces confronting each other and separated by transition modules providing electrical interconnections between the adjacent circuit-component modules; the confronting surfaces of the transition modules and of the adjacent circuit-component modules are provided with corresponding aligned contacts to provide the desired interconnections between the transition modules and the circuit-component modules, the corresponding contacts of the two types of modules being in contact with each other and, preferably, fused together or otherwise secured so as to provide not only electrical interconnection but also physical mounting of each module to the next. To accommodate discrete circuit components extending above the generally flat surface of the circuit-component modules, the adjacent transition modules may be provided with recesses or apertures into which the discrete components extend. By menas of appropriate vias and printed circuit connections, the transition modules provide the particular interconnections of the circuit component modules required to produce a given circuit operation. One extreme of the module assembly preferably terminates in an external-connection module adapted to connect the surface contacts of the adjacent module to external leads of known standard types; alternatively, the external-connection module may extend to, and provide appropriate interconnection to, one or more other similar modular assemblies by way of similar surface contacts thereon.

Preferably the inter-module connection contacts are formed by providing metal-containing vias in the modules at the points where the contacts are to be formed and by immersing the portions of the modules containing these vias in a low-melting-point molten solder which wets the metal so that, upon removal of the module from the solder, a globule of solder remains at and slightly above the exterior end of the aperture. After these globules are solidified, the various modules may be stacked in a jig so that the solder globules to be bonded together bear lightly against each other, the temperautre of the assembly raised sufficiently high to melt the low-melting-point solder globules, and the assembly then cooled to form the desired electrical and physical connections.

Preferably the modules each comprise laminated-ceramic substrates, by means of which the necessary connections may be made by appropriate combinations of vias and printed circuitry on the various levels of the substrate.

BRIEF DESCRIPTION OF THE FIGURES

These and other objects and features of the invention will be more readily understood from a consideration of the following detailed description, taken in connection with the accompanying drawings, in which:

FIG. 1 is an electrical schematic diagram showing the electrical nature of the circuit embodied in the particular form of the invention shown in the other figures;

FIG. 2 is an elevational view, partly broken away, of a complete stack assembly in accordance with the invention;

FIG. 3 is a plan view of the assembly of FIG. 2;

FIG. 4 is an enlarged longitudinal sectional view taken along lines 4—4 of FIG. 3;

FIGS. 5, 6, 7, 8, 9 10 and 11 are elevational views of the seven modules of the assembly of FIG. 4, detached from the surrounding structure;

FIG. 5a is a section along lines 5a—5a of FIG. 5;
FIG. 6a is a section along lines 6a—6a of FIG. 6;
FIG. 7a is a section along lines 7a—7a of FIG. 7;
FIG. 7b is a section along lines 7b—7b of FIG. 7;
FIG. 7c is a section along lines 7c—7c of FIG. 7;
FIG. 8a is a section along lines 8a—8a of FIG. 8;
FIG. 9a is a section along lines 9a—9a of FIG. 9;
FIG. 9b is a section along lines 9b—9b of FIG. 9;
FIG. 10a is a section along lines 10a—10a of FIG. 10;
FIG. 11a is a section along lines 11a—11a of FIG. 11;
FIG. 11b is a section along lines 11b—11b of FIG. 11;
FIG. 12 is an end view, partly in section, showing the modules of the stack in a supporting jig just prior to soldering together of the modules;

FIG. 13 is a perspective view showing an alternative form of transition module; and FIG. 14 is a perspective view showing an alternative form for the external-connection module of FIGS. 5 and 5a.

DESCRIPTION OF THE PREFERRED EMBODIMENTS

FIG. 1 is an electrical schematic of the circuit which is embodied in the module stack shown in the other figures. The particular circuit shown has been selected merely to simplify the description and not because it is particularly advantageous electrically in providing the functions which it performs. Nor does the circuit shown exploit the advantageous features of the invention to the fullest, the potentialities of the invention being instead more fully realized in applications in which there are many circuit components and connections for each module, many modules, and many intermodule connections.

The circuit in FIG. 1 is a modular form of exclusive OR circuit which produces an output at output terminal 10 when a signal $p$ is applied to input terminal 12 or when a signal $q$ is applied to input terminal 14, but produces no output signal at terminal 10 if the $p$ and $q$ signals are simultaneously present or simultaneously absent. To accomplish this the $p$ signal at input terminal 12 is supplied to both inputs of AND gate $A_1$ (assumed to be interconnected internally of the gate), the output line 16 of which is connected to the input of an inverter $I_1$. Output line $a$ of inverter $I_1$ is connected to one input of a two-input AND gate $A_3$.

In a similar manner, the $q$ signal at input terminal 14 is applied to both inputs of AND gate $A_2$, and thence over line 15 to an inverter $I_2$. The ouput line $b$ of inverter $I_2$ is connected to the other input of the two-input AND gate $A_3$. The signal at ouput line 20 of gate $A_3$ is applied to inverter $I_3$, the output line $c$ of which is connected to one input of AND gate $A_5$.

Both signals $p$ and $q$ at input terminals 12 and 14 are applied to AND gate $A_4$ to produce a signal at line 24 which is passed through invertor $I_4$ to line $d$ and thence to the other input of gate $A_5$. The signal at the output line 22 of gate $A_5$ is passed through inverter $I_5$, line $e$, AND gate $A_6$, line 28, and inverter $I_6$ to output line $f$.

The broken lines in FIG. 1 divide the circuit into three portions designated $M_1$, $M_2$ and $M_3$, each of which comprises two AND gate circuits each followed by corresponding inverters, although in some cases the two inputs of the AND gate may be connected together internally. Each of the gates and inverters requires for its operation supply potentials designated $V_1$, $V_2$ and G for ground. The circuit portions $M_1$, $M_2$ and $M_3$ represent the respective portions of the circuit to be provided in the three modules of the structure shown in the other figures. Each module therefore contains two pairs of gate-inverter combinations, with the output of each gate connected to the input of its associated inverter, three supply-voltage lines $V_1$, $V_2$ and G, and various intermodule and intramodule signal connections designated by $p$, $q$ and $a$ through $f$.

FIGS. 2 and 3 are elevation and plan views, respectively of a modular stack assembly in accordance with the invention, constructed to contain the circuitry shown in FIG. 1. The stack assembly is in the form of a rectangular block 30 in this case covered with a thin layer of an epoxy resin 32, and having three outwardly-extending bar connectors 34, 35 and 36 protruding from its narrow side near its top, and a similar set of three tab connectors 37, 38 and 39 similarly positioned on the opposite side of the stack assembly. Tab connectors 37, 38 and 39 are supplied, during electrical operation of the circuit with the supply voltages $V_1$, $V_2$ and G, respectively, connector tabs 34 and 36 are supplied with the $p$ and $q$ input signals, respectively and the output signal $f$ appears at tab 35. All of the remaining apparatus and interconnections of FIG. 1 are contained within the stack assembly 30.

Referring now to the enlarged longitudinal sectional view of FIG. 4, the view of the separate detached modules shown in FIGS. 5–11, and the horizontal sections of the latter views which are shown in the figures bearing numbers from 5 to 11 with letter suffixes $a$, $b$ and $c$, it will be seen that the stack assembly consists of seven vertically-stacked modules, namely, and in order from the top, external-connection module 40, transition module 42, circuit-component module 44, transition module 46, circuit-component module 48, transition module 50 and circuit-component module 52. Circuit-component modules 52, 48 and 44 contain the discrete circuit component and intramodule connections contained in portions $M_1$, $M_2$ and $M_3$ of the electrical schematic diagram in FIG. 1. The transition modules 50, 46 and 42, which alternate with the circuit-component modules, contain interconnections for connecting together electrically adjacent circuit-component modules, and contain central apertures 54 extending completely through them, to accommodate discrete components extending above the top surfaces of the circuit- component modules, such as the integrated circuit chips 60, 62, 64 and 66 on module 44; 68, 70, 72 and 74 on module 48; and 76, 78, 80 and 82 on modules 52. These chips are bonded to their substrates in conventional manner and provided on their top surfaces with integrated circuits constituting, respectively, the gates and inverters $A_6$, $I_6$, $A_5$, $I_5$; $A_4$, $I_4$, $A_3$, $I_3$; and $A_2$, $I_2$, $A_1$, $I_1$. The output of each gate is connected to the input of its corresponding inverter by deposited conductors such as 83 on the top surface of each circuit-component module.

The external-connection module 40 provides electrical connection from transition module 42 to the external tab connectors 34 through 39.

The seven modules comprise seven rectangular ceramic-layer substrate boards of identical dimensions, designated 84, 85, 86, 87, 88, 90 and 92 which are vertically aligned and held together by solder connections, of which joint 100 is an example, and by the sealing and protective epoxy coating 32. As will be described in greater detail hereinafter, each substrate has such solder connections on both of its opposite major surfaces. In the present example, each substrate consists of three layers or laminas, and it will be understood that the drawings are not necessarily to scale, particularly in that the thickness of the modules has been substantially exaggerated.

Tracing out the circuit of FIG. 1, the external connection 36 for receiving the $q$ signal is bonded in conventional manner to connection pad 102 on the undersurface of external-connection module 40, which in turn is connected to intermodule contact 104 by a conductor 106 deposited on the undersurface of the module. Contact 104 is continuous with the conductor-filled via 108 which extends through transition module 42 to a contact 110 on the lower surface thereof. The $q$ signal continues downwardly through all of the other modules by way of via 112, contact 114, via 116, contact 118, via 120, contact 122, via 124, and contact 126 on the upper surface of the bottom module 52. The required $q$ signal for gate $A_4$ on module 48 (FIG. 9a) is provided by a deposited lead 128 on the top surface thereof, and the $q$ signal is also connected to the input of gate $A_2$ on module 52 by a similar deposited lead 130 on top surface of the latter module.

Similarly, the $p$ signal supplied to external tab connection 34 passes downwardly through all of the modules to the bottom module 52, and appropriate deposited conductors for supplying the $p$ signal to gates $A_1$ and $A_4$ are provided on the top surfaces of modules 52 and 48, respectively.

The output signal of the complete system is supplied to tab connector 35 on the top module 40 from an output conductor 150 for inverter $I_6$ (chip 62) on the top surface of module 44. The desired interconnection is provided by the intermodular solder connection 152 circuit-component module 44 and transition module 42, and then by way of conductor 154 within transition module 42 to intermodule contact 156 located between transition module 42 and external connection module 40; a deposited conductor 158 and a conductive contact pad 160 on the lower side of module 40 complete the connection to tab connector 35.

The supply voltages $V_1$, $V_2$ and G are supplied to all of the gates and inverters from external tab connectors 37, 38 and 39 by conventional deposited pads and conductors to supply-voltage contacts 170, 172, 174 and 176, respectively, contacts 170 and 176 being interconnected by a deposited conductor 178 on the underside of the module 40. All of the other modules except bottom module 52 are supplied with vias extending completely through them, and with top and bottom intermodule contacts, which are directly aligned with the contacts 170, 172, 174, 176 on the underside of the external connection module 40, by means of which supply voltages $V_1$, $V_2$, G and $V_1$, respectively, all supplied to each of the modules at all levels therein. On module 52 corresponding contacts provide the desired supply connections, but do not extend entirely through the module in this example.

In each of the circuit-component modules these supply voltages are supplied to the two gates and two inverters therein in the manner shown in FIGURES 7, 7a and 7b for the case of module 44. More particularly, as shown in the latter figure, $V_1$ and $V_2$ are supplied to the two gates and two inverters of module 44 by deposited conductors on the top surface of the module. The ground connections, however, are provided by a deposited conductive pattern 200 located between the top layer and the second layer in the substrate 86 of module 44. Connection from the inter-layer pattern 200 to the ground leads on the top surfaces of the module are provided by the conductor-filled vias 202, 204, 206 and 208.

The only further connections to be provided are those corresponding to leads $a$, $b$, $c$, $d$ and $e$ in FIG. 1. Lead $a$ connects inverter $I_1$ to gate $A_3$ and thus requires a connection between circuit-component module 52 and circuit-component module 48, which is provided as follows. The conductor 212 from the output of inverter $I_1$ connects with intermodule contact 214 and thence connects to transition conductor 216 within transition module 50. The latter connection is provided by a via 218 (FIG. 10) extending upwardly through two layers within module 50. The conductor 216 runs horizontally between the top and second layers in module 50 and connects to an upwardly-extending via 222, which terminates in intermodule contact 224. Contact 224 communicate with a via 226 in module 48, which extends upwardly to the top surface of module 48, where it is connected to the input of gate $A_3$ by a deposited surface conductor 230 (FIG. 9a).

Connection $b$ extends from the output of inverter $I_2$ (FIG. 11a) upwardly into the transition module 50, sideways therein, and around the central aperture from the opposite end of module 50, where it passes upwards to the top surface of module 48 and along the top surface to gate $A_3$, in substantially the same manner as that described above for connection $a$, except that the horizontal conductor run in transition module 50 passes on the opposite side of the central aperture therein.

Similar techniques are utilized to provide the connections $c$ and $d$, which extend between the outputs of the inverters $I_3$ and $I_4$ of FIG. 9a, upwards and then horizontally to the opposite end of the superjacent transition module 46; from this position they extend upward through appropriate vias to the top surface of module 44 where suitable surface-deposited conductors connect them to the inputs of gate $A_5$.

The connection $e$ between the output of inverter $I_5$ and the input of gate $A_6$ occurs entirely within module 44, and is provided by way of a via 250 extending downwardly from output conductor 252 on the top surface of module 44, to a level between the second and third layers of substrate 86, at which level a horizontal conductor 253 provides connection to an upwardly-extending via 254, which extends all the way to the top surface of the module 44 to connect with a surface conductor 256 connected to the input of gate $A_6$.

It will be understood that in the figures the connections $p$, $q$, $a$, $b$, $c$, $d$, $e$ and $f$ are consistently labeled in the drawings of the several modules and substrate layers, so as to make clear the paths taken by these connections through the various modules.

It will be noted that the three circuit-component modules 44, 48 and 52 are provided with contacts on the opposite major surfaces thereof, as are the transition modules 42, 46 and 50, the transition modules serving appropriately to match the contacts on the module immediately below it to those of the module immediately above it. The circuit-component modules are of the same size and shape, have similarly placed intermodule contacts along the edges thereof for providing intermodule signal connections, and have other generally similarly-placed contacts for certain intramodular connections. It will be understood that additional apertures and vias may be provided in the various modules, for example a total of twenty at the same positions on each module, which in the present case would not all be utilized, but which would make available more possibilities for interconnections than are shown in the present example and would provide for further standardization of the modules.

To fabricate the device shown in the figures, unfired individual wafers of the various substrates are first formed and punched with holes in positions where vias extending through, or partially through, a module are desired. The desired surface patterns of conductors are applied, by doctor-blading a conductor such as cer-met through a stainless steel screen onto alumina substrate material. In general the conductor materials are mixtures of silicon oxides with metals such as silver, palladium, gold or platinum-gold. In the latter process the conductive material is caused to enter the apertures in each lamina so that conductor-filled vias are provided where desired. The wafers or layers for each module are then assembled in aligned relation, laminated under high pressure and temperature, and then sintered to form substantially integral modules. The discrete components, such as the chips providing the various gates and inverters, are bonded in the appropriate positions on the upper surfaces of the sintered circuit-component modules, and appropriate fine-wire leads (numeral 400 in the figures) spot-welded to them and to the appropriate adjacent surface conductors. Procedures for thus fabricating the individual modules are known in the art and hence need not be described in further detail. The techniques suitable for making the external-connection module 40 are also well known in the art and need not be described.

In order to provide the necessary intermodule connections, a globule of solder is provided at each point where such connection is desired. There are a variety of ways in which such solder globules can be provided at the desired location, and the inventive device and methods for making it are not limited to any particular way of making such globules. However, it is particularly convenient to utilize the following process for forming the globules.

During the fabrication of the individual layers comprising the ceramic-layer substrates, a via extending at least slightly downwardly into the substrate is formed at each position where a globule of solder is later to be formed. In most cases, such a via will exist in any event because of the requirements of the circuitry, but where this is not the case a via extending to the depth of at least one lamina may conveniently be provided, purely for the purpose of assisting in forming the globule. The conductor material may be of the materials previously mentioned. The portions of each module on which globules are to be formed are then dipped into a molten low-melting-point solder such as 60–40 lead-tin solder at 220° C., removed and shaken, and allowed to cool. By using such a solder, which wets the conductor material but not the ceramic, surface tension causes formation of hemi-spherical solder globules at the open ends of the vias. The solder may also adhere to some of the exposed conductive leads, but this does no harm to the fabrication process or to the completed device. In some cases only the portions of the modules on which the globules are to be formed are dipped into the solder, and in other cases the entire module may be so dipped. In the latter case, the dip is preferably performed prior to mounting of the discrete components on the modules. However, in some cases the discrete components may be mounted on the modules prior to the dip and protected during the dip, if desired, by first coating them with an appropriate protective coating such as a silicate, in known manner.

As shown in FIG. 12, to provide the intermodule soldered connections the modules may be aligned in a vertical stack and so held in a suitable jig 300 having a cap 302, placed in an oven, and heated to fuse the low-melting-point solder globules. When the jig and its contents are removed from the oven and allowed to cool, the desired intermodular connections will have been formed.

In some cases intermodule connections may be provided purely for mechanical purposes, for example one at each of the four corners of each module, so that a strong mechanical mounting will be provided by the soldering operations. However, other mechanical support may be provided if desired, as by a frame or clamp. Such support is inherently provided to some extent by encapsulating the soldered assembly in a suitable epoxy resin, by known methods. If desired, air within the assembly may be expelled and replaced by an inert gas prior to such encapsulation, or a standard hermetic seal may be provided at the interfaces between modules.

FIG. 13 illustrates one alternative form of a transition module, in which the substrate 304 is provided with a recess 306 extending only partly through it, so that the module has the general shape of a cap. This permits connections such as 308 to be made not only alongside of, but also over, the recess, thereby accommodating a greater number of such connections. As also shown in FIG. 13, the transition module may be utilized not only to provide through connections from one surface to the other, but also, as represented by connection 308, to provide connection between different points on the same underlying circuit-component module.

FIG. 14 illustrates an alternative form of external-connection module which not only provides the desired transition from a first stack assembly 300 to the external tab connections 302, 304, 306, 308, 310, 312, but also provides a similar transition for another stack assembly 320, as well as any necessary interconnections between the two stacks 300 and 320.

It will be understood that any number of stacks may be interconnected in a similar manner.

The stack assembly of the invention therefore provides a three-dimensional form, high-density packaging, modular construction, minimum lead lengths, and fully-supported and protected lead connections, and at the same time requires only one soldering operation to interconnect all modules and permits use of a simple efficient method for applying the solder for the intermodule connections. The invention is not limited to ceramic-layer boards or to ceramic substrates of any form, and may for example use multilaminate copper-clad epoxy boards as substrates.

While in the interest of complete definiteness the invention has been described with particular reference to a specific embodiment thereof, it will be understood that it may be embodied in any of a wide variety of forms diverse from those specifically shown without departing from the scope of the invention as defined by the appended claims.

What is claimed is:

1. A microelectronic stack assembly comprising: a plurality of spaced-apart circuit-component modules arranged in a stack, each of said circuit-component modules comprising a substrate and discrete circuit elements protruding above a surface of said substrate by less then a predetermined distance; a plurality of transition modules alternating with said circuit-component modules in said stack, each of said transition modules containing recesses of a size and location to encompass the protruding portions of said discrete circuit elements; a plurality of integral contacts, each secured to and extending between one of said transition modules and an adjacent one of said circuit-component modules; said discrete circuit elements electrically connected to said contacts, each of said transition modules comprising at least one conductor extending between a pair of said contacts disposed on opposite surfaces of said transition modules; and said circuit-component modules and said transition modules being contiguous with and in contact with adjacent modules except at said recesses and cooperating to form a solid stack with interior voids only where said recesses encompass said discrete circuit elements.

2. The assembly of claim 1 (twice amended), in which said recesses extend completely through said each transition module.

3. The assembly of claim 1 in which said recesses extend only part way through said each transition module.

4. The assembly of claim 1 in which said at least one conductor extends transversely of said assembly from one side of one of said recesses to the other.

References Cited

UNITED STATES PATENTS

| 2,786,969 | 3/1957 | Blitz | 317—101D(UX) |
| 3,189,978 | 6/1965 | Stetson | 174—68.5(UX) |
| 3,193,789 | 7/1965 | Brown | 174—68.5(UX) |
| 3,212,047 | 10/1965 | McDonough | 317—101D(UX) |
| 3,239,719 | 3/1966 | Shower | 317—100X |
| 3,340,438 | 9/1967 | Dion et al. | 317—101A(UX) |
| 3,340,439 | 9/1967 | Henschen et al. | 317—101D(UX) |
| 3,365,620 | 1/1968 | Butler | 317—101C(UX) |
| 2,907,926 | 10/1959 | Slack | 317—101D(UX) |
| 3,307,067 | 3/1963 | Jackson et al. | 317—101A(UX) |
| 3,370,203 | 2/1968 | Kravitz et. al. | 317—101A(UX) |
| 3,459,998 | 8/1969 | Focarile | 317—100 |

FOREIGN PATENTS

| 1,375,514 | 9/1964 | France | 317—101D(UX) |

OTHER REFERENCES

Chapman et al. "Microelectronic Packaging Technique," IBM Tech. Disc. Bulletin, vol. 6, No. 10, March 1964, pp. 70–71.

DAVID SMITH, JR. Primary Examiner

U.S. Cl. X.R.

174—68.5

PO-1050
(5/69)

UNITED STATES PATENT OFFICE
CERTIFICATE OF CORRECTION

Patent No. 3,555,364          Dated January 12, 1971

Inventor(s) Thomas J. Matcovich

It is certified that error appears in the above-identified patent and that said Letters Patent are hereby corrected as shown below:

Column 1, line 59, change "circuit" to --circuits--.
Column 2, line 22, change "bp" to --by--.
Column 2, line 38, change "connectionst hereof" to
 --connections thereof--.
Column 3, line 49, change "modles" to --modules--.
Column 3, line 71, change "menas" to --means--.
Column 4, line 44, change "the" to --their--.
Column 5, line 71, change "component" to --components--.
Column 6, line 7, change "modules" to --module--.
Column 6, line 58, after "152" insert --between--.
Column 7, line 13, change "surface" to --surfaces--.
Column 7, line 33, change "communicate" to --communicates--.

Column 10, line 45, omit "3,307,067 3/1963 Jackson et al.
 -317- 101A(UX)".

Signed and sealed this 22nd day of June 1971.

(SEAL)
Attest:

EDWARD M. FLETCHER, JR.        WILLIAM E. SCHUYLER, JR.
Attesting Officer                Commissioner of Patents